(12) United States Patent
Anatole et al.

(10) Patent No.: US 10,520,757 B2
(45) Date of Patent: Dec. 31, 2019

(54) METHOD FOR VERIFYING CONFORMITY WITH A PREDETERMINED CRITERION OF USE OF A SPECTACLE FRAME AND ASSOCIATED DEVICE

(71) Applicant: ESSILOR INTERNATIONAL, Charenton-le-Pont (FR)

(72) Inventors: Vincent Anatole, Charenton-le-Pont (FR); Thierry Allouis, Charenton-le-Pont (FR); Daniel Ferreira, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 15/747,468

(22) PCT Filed: Jul. 28, 2016

(86) PCT No.: PCT/FR2016/051975
§ 371 (c)(1),
(2) Date: Jan. 25, 2018

(87) PCT Pub. No.: WO2017/021633
PCT Pub. Date: Feb. 9, 2017

(65) Prior Publication Data
US 2018/0217405 A1 Aug. 2, 2018

(30) Foreign Application Priority Data
Jul. 31, 2015 (FR) .................................... 15 57448

(51) Int. Cl.
*G02C 13/00* (2006.01)
*G01B 11/24* (2006.01)
*G01B 5/20* (2006.01)

(52) U.S. Cl.
CPC ............ *G02C 13/003* (2013.01); *G01B 11/24* (2013.01); *G01B 5/20* (2013.01)

(58) Field of Classification Search
CPC ........... G01B 11/24; G01B 5/20; G01L 35/20; G02C 13/003
(Continued)

(56) References Cited

U.S. PATENT DOCUMENTS

2016/0327815 A1  11/2016  Rego et al.

FOREIGN PATENT DOCUMENTS

| CN | 101713647 | 5/2010 |
| CN | 101801259 | 8/2010 |

(Continued)

OTHER PUBLICATIONS

International Search Report, dated Oct. 19, 2016, from corresponding PCT/FR2016/051975 application.
(Continued)

*Primary Examiner* — Tri T Ton
(74) *Attorney, Agent, or Firm* — Young & Thompson (57) ABSTRACT

Disclosed is a method for verifying conformity with a predetermined criterion of use of a spectacle frame intended to receive two ophthalmic lenses, including: a) at least one geometrical, mechanical, and/or structural characteristic is determined and the frame category to which the frame belongs from a set of predetermined spectacle-frame categories is deduced therefrom; b) an outline of at least one of the ophthalmic lenses intended to be mounted in the spectacle frame or of a rim of this spectacle frame is determined; c) the value of each parameter from a list of parameters of the frame is evaluated, considering the frame category of step a); the value of at least some of the parameters being evaluated as a function of the outline determined in step b); d) the conformity of the spectacle frame to the predeter-
(Continued)

mined criterion is deduced from the values of the parameters of the spectacle frame.

14 Claims, 2 Drawing Sheets

(58) Field of Classification Search
USPC .................................................. 356/601–640
See application file for complete search history.

(56) References Cited

FOREIGN PATENT DOCUMENTS

FR       2 910 647 A1    6/2008
FR       3 016 052 A1    7/2015

OTHER PUBLICATIONS

Chinese Office Action for Application No. 201680044583.5 dated May 13, 2019 with English translation provided.

METHOD FOR VERIFYING CONFORMITY WITH A PREDETERMINED CRITERION OF USE OF A SPECTACLE FRAME AND ASSOCIATED DEVICE

TECHNICAL FIELD TO WHICH THE INVENTION RELATES

The present invention is generally concerned with the field of the manufacture of pairs of spectacles.

It is more particularly concerned with a method for verifying the conformity with a predetermined criterion of use of a spectacle frame that is intended to receive two ophthalmic lenses.

TECHNOLOGICAL BACKGROUND

There has recently been noted a diversification of the offer in terms of spectacle frames. Many businesses are starting to manufacture spectacle frames without having a full knowledge of the material and shape constraints imposed by mounting ophthalmic lenses in these frames. The development of an offer of low-price spectacle frames is moreover leading to spectacle frames of lower quality coming onto the market.

For these various reasons there exist on the market spectacle frames for which the classic industrial processing methods for ophthalmic lenses cannot be used. Trimming and mounting the ophthalmic lenses intended for these frames requires the use of special techniques that most of the time necessitate manual intervention by the operator. In some cases trimming and mounting ophthalmic lenses intended for these frames is even impossible, at least for some prescriptions.

At present, detecting spectacle frames for which cutting and mounting the ophthalmic lenses requires special techniques or is difficult is often effected too late, after the order submitted by the client. This leads to delays in the process of manufacture of the pair of spectacles or even the necessity for the client to make a different choice.

OBJECT OF THE INVENTION

In order to remedy the aforementioned disadvantages of the prior art, the present invention proposes a method for verifying conformity with a predetermined criterion of use of a spectacle frame allowing the detection of spectacle frames necessitating the use of special techniques or unable to accept some types of ophthalmic lenses.

The invention more particularly proposes a method for verifying conformity with a predetermined criterion of use of a spectacle frame intended to receive two ophthalmic lenses, in which the following steps are carried out:

a) at least one geometrical and/or mechanical and/or structural characteristic of this spectacle frame is determined and the spectacle-frame category to which said spectacle frame belongs from a set of predetermined spectacle-frame categories is deduced therefrom, b) an outline in two or three dimensions of at least one of said ophthalmic lenses intended to be mounted in said frame or of a rim of that frame is determined, c) the value of each parameter from a list of parameters of said frame is evaluated, this list being determined as a function of said frame category determined in step a), the value of at least some of said parameters being evaluated as a function of said outline determined in step b), d) the conformity of the frame to the predetermined criterion is deduced from the values of said parameters of the frame determined in step c).

Accordingly, thanks to the method according to the invention, it is possible to evaluate the quality of a frame and its capacity to accept corresponding ophthalmic lenses.

Indeed, to be able to accept an ophthalmic lens the frame must conform to technical criteria. Moreover, to manufacture the corresponding pair of spectacles the frame must also conform to other criteria linked to the standard industrial methods of processing of the frame and the ophthalmic lenses.

Thanks to the method according to the invention, it is possible to show for example frames having:
- non-reproducibility of spectacle frames with the same reference,
- non-standard means for mounting the ophthalmic lenses (bezel or drilled holes of non-standard shape),
- deformability of the frame ruling out mounting ophthalmic lenses,
- an overall shape ruling out mounting ophthalmic lenses having a thickness greater than a threshold, or
- a manufacturing defect.

Moreover, it enables highlighting of spectacle frames for which the standard processing methods are prohibited, for example because of:
- an incompatibility between the characteristics of the frame and the standard technique for acquiring the outline of the bezel,
- an incompatibility between the characteristics of the ophthalmic lenses intended to be mounted in the frame and the standard technique for edging the lenses,
- an incompatibility between the material of the frame and the heating and/or cleaning steps carried out during the standard methods of mounting ophthalmic lenses in the frame.

In step a) the method according to the invention enables classification of the spectacle frames on the market into different categories indicating the industrial processes that can be used for that frame based on a predetermined identification file supplied by the manufacturer of the frame or on visual examination of the frame.

The information in this file or collected by this visual examination is cross-referenced with the data obtained in step b). This enables verification of the information contained in the predetermined identification file associated with the frame.

Moreover, this data obtained in step b) and the information collected in step a) can be combined to determine the value of each parameter from a list of parameters determined as a function of said frame category determined in step a).

The list of parameters is therefore adjusted as a function of the frame category. Some parameters are in fact relevant for some categories of frames only.

The conformity of the frame with the predetermined criterion is then determined in step d) as a function of the values of the parameters determined in step c). This notably enables assessment of whether the strength and the esthetic finish of the pair of spectacles obtained after mounting ophthalmic lenses in the frame will be satisfactory.

The frame categories used in step a) relate to the frame tracing technologies and ophthalmic lens trimming technologies used at present and may evolve over time as and when technical progress is made in these fields.

Other non-limiting and advantageous features of the method according to the invention are as follows:

said geometrical and/or mechanical and/or structural characteristic of this frame determined in step a) relates to the type of instrument necessary for determining said outline in two or three dimensions of the ophthalmic lens intended to be mounted in said frame or of the rim of this frame and/or the type of instrument necessary for edging this ophthalmic lens;

said geometrical and/or mechanical and/or structural characteristic of the frame determined in step a) comprises at least one of the following characteristics:

general shape of the frame, type of retention of the ophthalmic lenses to the frame, shape of the profile of the bezel of the frame and/or position of this bezel relative to the front and rear faces of the frame, shape of the nose portion of the frame intended to be in contact with the nose of the wearer, presence of elements partly covering a rear or front face of the ophthalmic lens disposed in the frame, mechanical characteristics of the material of the frame, presence of areas of concavity in said outline of the rim of the frame or of the corresponding ophthalmic lens;

in step a) each geometrical and/or mechanical and/or structural characteristic of the frame is determined by reading a frame identification file associated with this frame;

in step a) said geometrical and/or mechanical and/or structural characteristic of the frame is determined visually by an operator;

in step b) the outline in two dimensions of the ophthalmic lens intended to be mounted in said frame is determined by image acquisition from a reference ophthalmic lens associated with said frame or on the basis of an ophthalmic lens drawing associated with said frame;

in step b) the outline in three dimensions of a rim of this frame is determined by determining the position in three dimensions of the bezel of this rim;

in step c) said list of parameters of said frame comprises parameters relating to:

the shape of the frame, such as the following parameters: symmetry of the frame about a horizontal axis and/or a vertical axis, accuracy of the outline determined in step b), presence and/or position and/or extent of the areas of concavity of the outline determined in step b), overall curvature of the frame, geometrical characteristics of the bezel such as the shape of the profile of the bezel, the depth of the bezel, the angle of inclination between the internal walls of the bezel, the position of the bezel relative to the front and rear faces of the corresponding rim of the frame, the uniformity of the characteristics of the profile of the bezel along the latter, the mechanical characteristics of the frame such as the degree of flexibility of the bridge of the frame, the temples and the rims, the compatibility with the frame of the material used to manufacture the ophthalmic lenses, the constraints on mounting the ophthalmic lens in the frame such as the position of the articulation between the temples and the rims, the possibility of heating the frame, the distance between the folded temples and the rims of the frame, the resistance of the frame to chemical products used to clean the frame and/or the ophthalmic lenses, the possibility of removing the reference lenses from the frame without damaging it, the consistency between the outline in two or three dimensions determined in step b) and said at least one geometrical and/or mechanical and/or structural characteristic of this frame determined in step a);

in step d) each value of one of the parameters of the frame evaluated in step c) is associated with a score of the frame for that parameter and the conformity of the frame with the predetermined criterion is determined as a function of the scores of this frame;

the conformity of the frame to the predetermined criterion is determined by comparing the score of the frame for each parameter evaluated and a reference score associated with that parameter;

said reference score depends on the criterion of use to be verified; and in step d) the criterion of use of the frame is a criterion of feasibility of a pair of spectacles indicating that the frame is adapted to receive the corresponding ophthalmic lenses or a criterion of industrial feasibility indicating that the frame is adapted to receive the corresponding ophthalmic lenses via a predetermined industrial fabrication process.

The invention also concerns a device for verifying the conformity with a predetermined criterion of use of a spectacle frame intended to receive two ophthalmic lenses comprising a computer processing unit programmed to control the execution of or to execute at least one of the steps of the verification method described above.

This verification device preferably further comprises an instrument for measuring an outline in two or three dimensions of at least one of said ophthalmic lenses intended to be mounted in said frame or of a rim of this frame adapted to execute step b) of the verification method described above.

DETAILED DESCRIPTION OF ONE EMBODIMENT

The following description with reference to the appended drawings, which are provided by way of non-limiting example, will make clear in what the invention consists and how it can be reduced to practice.

The invention proposes a method for verifying conformity with a predetermined criterion of use of a spectacle frame intended to receive two ophthalmic lenses.

This criterion of use of the frame is for example a criterion of feasibility of a pair of spectacles indicating that the frame is adapted to receive the corresponding ophthalmic lenses, referred to hereinafter as the feasibility criterion.

It can equally be a criterion of industrial feasibility indicating that the frame is adapted to receive the corresponding ophthalmic lenses via a predetermined industrial manufacturing method. This criterion is referred to hereinafter as the industrial feasibility criterion.

Other criteria can equally be envisaged, such as a criterion of quality of the pair of spectacles obtained or a criterion of esthetic appeal.

Each of these criteria can be an absolute criterion, i.e. the criterion evaluated for all types of ophthalmic lenses and all prescriptions, or a relative criterion, determined for a predefined type of ophthalmic lenses.

For example, in the case of relative criteria, the feasibility criterion or the industrial feasibility criterion can differ depending on whether the ophthalmic lens has a greater or lesser thickness or curvature. In other words, these relative criteria depend on the prescription corresponding to the lenses intended to be mounted in the frame and the material characteristics of the lens.

To be more precise, the feasibility criterion indicates if the frame is adapted to receive any ophthalmic lens. This feasibility criterion is satisfied when the material, the overall shape and the means of fixing ophthalmic lenses to this frame satisfy certain conditions.

For example, the material must be sufficiently rigid to retain the ophthalmic lenses, the overall shape must not have parts that overhang above the ophthalmic lenses and the bezel must have a shape and a minimum depth adapted to retain ophthalmic lenses in the rims of the frame.

The industrial feasibility criterion indicates if the frame is adapted to receive any ophthalmic lens via a predetermined standard industrial method of manufacture.

For example, this method can impose that the bezel of the rims of the frame be traced by a specific instrument, that the ophthalmic lens intended for this frame be edged by a specific tool, that the frame be heated to facilitate the insertion of the ophthalmic lenses in the rims and that the pair of spectacles obtained be cleaned using a chemical product of given composition.

The industrial feasibility criterion then reflects the compatibility of the frame concerned with each of the steps of this method.

The verification method more precisely comprises the following steps:

a) at least one geometrical and/or mechanical and/or structural characteristic of this frame is determined and the frame category to which said frame belongs from a set of predetermined frame categories is deduced therefrom, b) an outline in two or three dimensions of at least one of said ophthalmic lenses intended to be mounted in said frame or of a rim of this frame is determined, c) the value of each parameter from a list of parameters of said frame is evaluated, this list being determined as a function of said frame category determined in step a) and the value of at least some of said parameters being evaluated as a function of said outline determined in step b), d) the conformity of the frame to the predetermined criterion is deduced from the values of said parameters of the frame determined in step c).

This method is executed by a verification device according to the invention comprising a computer processing unit.

This computer processing unit is programmed to control the execution of or to execute at least one of steps a) to d). It can control the execution of or execute all the steps.

There exist three main spectacle-frame categories. There are therefore distinguished full-rim spectacle frames, semi-rimless spectacle frames (also known as arch frames) and rimless spectacle frames (also known as drilled frames).

Full-rim spectacle frames conventionally include two rims, or circles, each intended to accept an edged ophthalmic lens. These two rims are connected to one another by a bridge and each carries one temple. Each rim features a groove, commonly termed the bezel, that extends along its interior face. The frames 20, 30 shown in FIGS. 3 and 4 are examples of full-rim frames.

Figure 3:
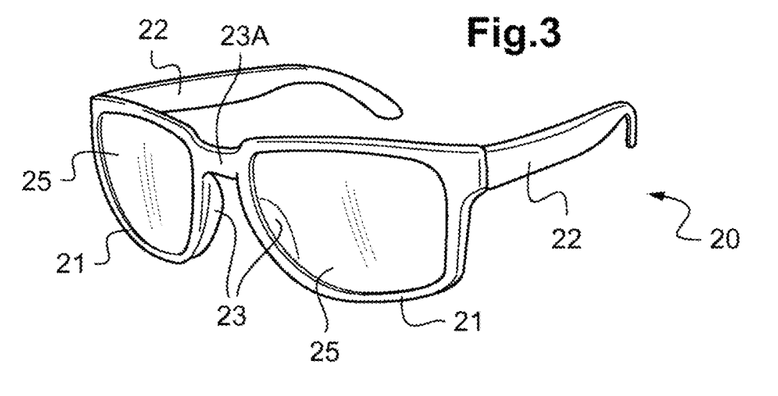

The full-rim frame 20 from FIG. 3 comprising two rims 21 each connected to one of two temples 22 and a nose part comprising the bridge 23A and areas 23 resting on the nose of the wearer. It accepts ophthalmic lenses 25.

Figure 4:
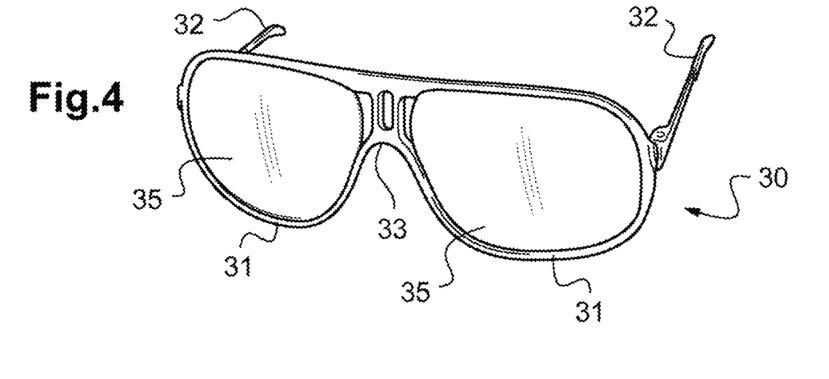

The full-rim frame 30 from FIG. 4 features two rims 31 and two temples 32, said rims 31 being open at the level of a nose part of this frame. This nose part includes the bridge 33 and areas resting on the nose of the wearer (not shown in FIG. 4). It accepts ophthalmic lenses 35.

When the spectacle frame is a full-rim frame, the ophthalmic lens must be edged so as to have along its edge surface a nesting rib commonly termed a bevel. The bevel formed in this way on the edge surface of the lens is then adapted to nest in the bezel of the full-rim frame.

Semi-rimless spectacle frames include two arches with ribs on the interior faces and two retaining filaments that are connected to the ends of the arches to form with them closed outlines.

Figure 5:
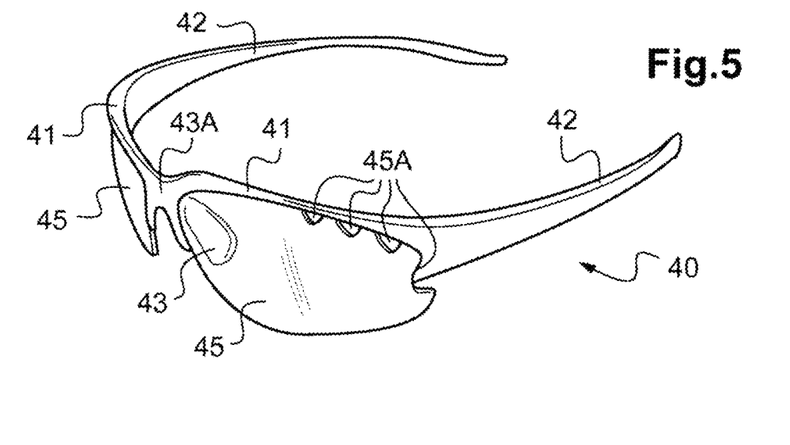

The frame 40 shown in FIG. 5 is an example of a semi-rimless frame. This frame 40 features two arches 41 and two temples 42 articulated to these arches, said arches 41 being connected by a nose part of this frame. This nose part includes the bridge 43A and areas 43 resting on the nose of the wearer. It accepts ophthalmic lenses 45.

When the spectacle frame is a semi-rimless frame, the ophthalmic lens must be edged to feature a recessed peripheral groove along its edge surface. The lens is then held in place in the spectacle frame by nesting the upper part of its edge surface in the rib provided along the internal face of the corresponding arch and engaging the retaining filament in the groove.

Finally, rimless spectacle frames include two temples and a bridge but have no rim or arch. These temples and this bridge are adapted to be fixed to said lenses by means of holes previously drilled in the ophthalmic lenses.

Figure 2:
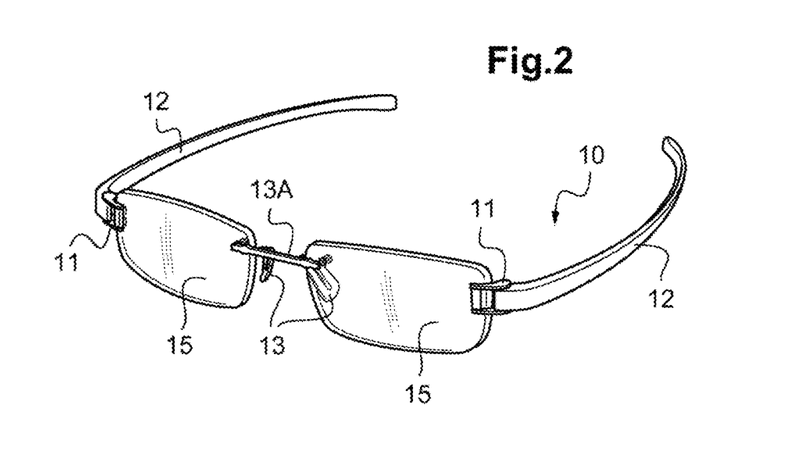
FIGS. 2 to 5 show examples of spectacle frames classified into different frame categories.

The frame 10 shown in FIG. 2 is an example of a rimless drilled frame.

It comprises two temples 12 each articulated to a supporting element 11 that is fixed to one of the ophthalmic lenses 15 of this pair of spectacles by screws in the drilled holes provided for this purpose in these lenses. A nose part connects the two ophthalmic lenses. This nose part comprises a horizontal bar 13A forming the bridge and two pads 13 intended to be placed on the nose of the wearer.

When the spectacle frame is a rimless frame, the ophthalmic lens must be edged so as to feature an edge surface the section of which is straight and then be drilled so that the bridge and the corresponding temple of the spectacle frame can be firmly fixed to it.

The role of the optician is thus to mount a new pair of lenses (referred to as "lenses to be edged") to the spectacle frame selected by the wearer.

This may be a new spectacle frame or an old spectacle frame (when the glasses wearer wishes to change their ophthalmic lenses whilst retaining their spectacle frame).

When it is new the spectacle frame is generally supplied to the optician with presentation lenses (or templates) of zero power and constant thickness.

An old spectacle frame is generally supplied to the optician with ophthalmic lenses that are to be replaced.

These ophthalmic lenses that are initially in the spectacle frame (whether old or new) are referred to hereinafter in this description as "reference lenses".

Before edging new ophthalmic lenses in order to replace these reference lenses the optician has to carry out an operation of acquisition of the outline to which each new ophthalmic lens will have to be edged.

Step a)

Figure 1:
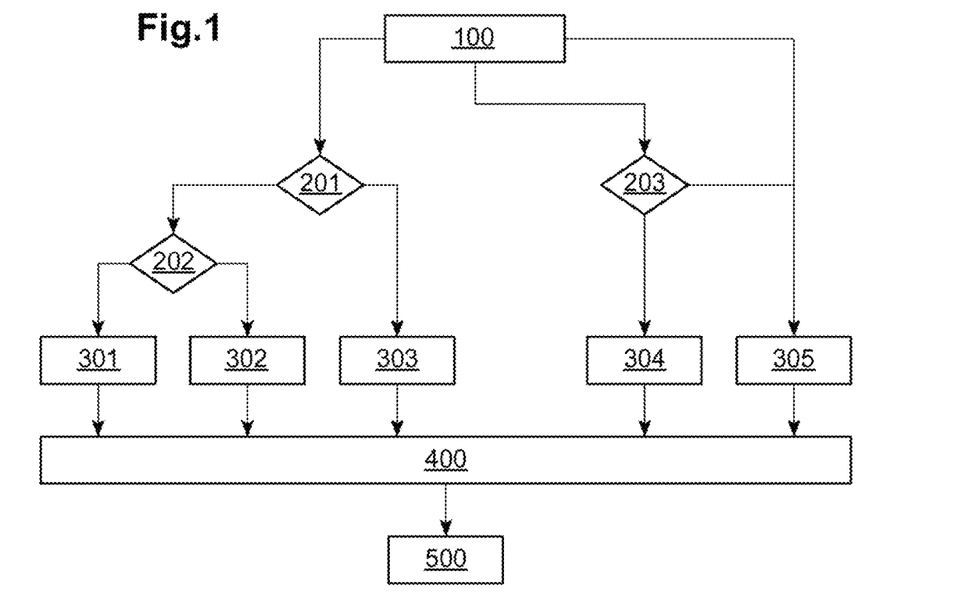
FIG. 1 is a diagram detailing the various steps of the verification method according to the invention.

Step a), represented by the block 100 in FIG. 1, consists in classification of the frame concerned in one of various predetermined frame categories.

This classification is carried out as a function of said at least one geometrical and/or mechanical and/or structural characteristic of this frame determined in step a).

In practice, according to the method according to the invention, when the operator receives a new frame they determine a plurality of geometrical and/or mechanical and/or structural characteristics of that frame and deduce therefrom to which frame category said frame belongs.

The computer processing unit can equally be programmed to determine in step a) one of the predetermined frame categories to which the frame concerned belongs.

The computer processing unit determines this category on the basis of information entered by the operator or extracted from a digital file or information transmitted by measuring devices or for example by processing one or more captured images of the frame.

Each of the geometrical and/or mechanical and/or structural characteristics of the frame can be determined by reading a frame identification file associated with that frame or visually by this operator.

In the former case the operator recovers the information contained in the identification file of the frame and deduces therefrom the required characteristics.

The identification file can be a printed document physically accompanying the frame and indicating various characteristics thereof, for example material, 2D drawing of the outline of the rims and/or the lenses, drawing of the profile of the section of the bezel, dimensions, curvature of the frame.

The identification file can equally be a digital file associated with the frame via a numerical reference, a barcode or an RFID sticker applied to the frame. This digital file can contain all the information cited above plus an outline in three dimensions of the rims or of the corresponding lens.

It can be recovered by the computer processing unit, which extracts from it the required characteristics.

Alternatively, the operator can equally determine the plurality of geometrical and/or mechanical and/or structural characteristics of this frame visually by manual examination of the frame and where appropriate by taking measurements of the frame manually.

The operator preferably enters into the computer processing unit the result of the manual examination of the frame and/or the measurements taken.

Said geometrical and/or mechanical and/or structural characteristics of the frame determined in step a) comprise at least one of the following characteristics and preferably a plurality of these characteristics:
  the general shape of the frame: simple or complex,
  the type of retention of the ophthalmic lenses on the frame: full-rim frame with a bezel, semi-rimless frame with a beveled rim part and a nylon filament, drilled frame with means for screwing on the ophthalmic lenses, or mixed retention frame combining a number of these retaining means, the latter frames being referred to hereinafter as multi-retention frames,
  the shape of the profile of the bezel of the frame: a V, U, T shape for example and/or the position of this bezel relative to the front and rear faces of the frame: centering of the bezel relative to the thickness of the rim of the frame, symmetry of the profile of the section of the bezel,
  the shape of the nose part of the frame intended to be in contact with the nose of the wearer, imposing greater or lesser risks of collision with the lens,
  the presence of elements partly covering a rear or front face of the ophthalmic lens disposed in the frame,
  the mechanical characteristics of the material of the frame, notably the flexibility of the frame,
  the presence of areas of concavity, also referred to as "concave areas" hereinafter, in said outline of the rim of the frame or of the corresponding ophthalmic lens.

Each frame category of the set of frame categories is for example relative to the type of instrument necessary for determining in step b) said outline in two or three dimensions of the ophthalmic lens intended to be mounted in said frame or the rim of this frame and/or the type of instrument necessary for edging this ophthalmic lens.

Alternatively, the frame categories being determined as a function of the method used to determine the profile in two or three dimensions of the ophthalmic lens intended to be mounted in this frame or the rim of this frame and/or the method used to edge this lens can equally be envisaged.

Accordingly, in the example of execution of the method according to the invention described here one considers for example various methods and instruments that can be used to trace the outline of the bezel of the rim or of the rim part intended to receive the ophthalmic lens or to determine the outline of the lens intended to be mounted in the frame.

In a similar way, one considers that two different instruments may be used to edge each ophthalmic lens intended to be mounted in this frame.

The frames are then divided into four categories as a function of the tracing and edging possibilities.

In practice these four categories are defined in the following manner here.

A first category is referred to hereinafter as the "standard frames" category.

These frames have a simple overall shape with a standard full-rim, semi-rimless of the "nylor" type or rimless, i.e. drilled, structure, the curvature of which being small or moderate.

Moreover, for full-rim frames, the bezel produced as a depression in the internal edge surface of each rim or rim portion has a cross section of symmetrical V shape.

The nose part of the frame is small.

There is no element in the frame partly covering a rear or front face of the ophthalmic lens disposed in the frame.

These frames are made from a rigid material, metal or hard plastic.

The outline of the rim of the frame or of the corresponding ophthalmic lens features no area of concavity.

The frame 10 shown in FIG. 2 belongs to this first category. This frame 10 is drilled, rimless.

A second category of frames is referred to hereinafter as the "standard plus frames" category.

These "standard plus frames" have characteristics similar to those of the frames of the first category except that they have a shape that may encourage collisions between ophthalmic lenses and frames above a threshold thickness of the ophthalmic lens: this relates for example to a frame having areas resting on the nose of the wearer or junction areas between temples and rims, for example an articulation between temples and rims, that is or are particularly wide. These areas can then in fact collide with each ophthalmic lens and prevent the correct mounting of the ophthalmic lens in the rim.

There is defined for each area of possible collision with the lens a maximum free distance between the middle of the bezel and the point of frame/lens collision nearest this middle of the bezel.

Frames for which this maximum free distance is less than or equal to one centimeter are classified in the second category.

Moreover, these frames have a simple overall shape, with a full-rim, semi-rimless "nylor" type or rimless, i.e. drilled, standard structure the curvature of which is small or moderate.

No element is present partly covering a rear or front face of the ophthalmic lens disposed in the frame.

These frames are made from a rigid material, metal or hard plastic.

The outline of the rim of the frame or of the corresponding ophthalmic lens features no area of concavity.

The frame 20 shown in FIG. 3 belongs to this second category. Here it is a full-rim frame. The areas 23 of the nose part of this frame 20 resting on the nose of the wearer are particularly wide and can lead to collisions.

The bezel recessed in the internal edge surface of each rim or rim portion has a cross section with a V shape that here can be symmetrical or asymmetrical.

These are for example frames in which the bezel has a V-shape section with one temple of the V larger than the other.

Standard plus frames can also feature a bezel the section of which has an atypical shape, for example a T or U shape.

Frames from these first and second categories have in common the fact that the acquisition of the outline of the rim of the frame or of the lens intended to be mounted in this frame can be obtained with the aid of standard instruments, such as an outline tracer fitted with a stylus like the TESS© tracer or an edger-tracer like the Mr. Blue© tracer of the applicant.

In concrete terms, when the spectacle frame is a full-rim frame, this acquisition operation generally consists in the optician using the outline tracer to palpate the interior outline of the rim of the selected spectacle frame in order to determine accurately the coordinates of points characterizing the shape of the outline of at least one of the rims.

On the other hand, when the spectacle frame is a semi-rimless or rimless frame (the lenses then being drilled), a template (i.e. generally a reference lens supplied to the optician with the spectacle frame) is used to determine the shape that the ophthalmic lens to be edged has to have. It is then a question of using an image capture device in order to capture the image of this reference lens. Optical acquisition of an image of this template removed from the spectacle frame in fact enables the shape of the outline of this template to be traced together with the position of any holes in this template. This is done by a computer using an outline detection algorithm that processes the captured image.

On the other hand, ophthalmic lenses for the first frame category can be edged by means of a standard grinding tool, typically a grinding tool including one or more edging tools mobile along three mobility axes, whereas ophthalmic lenses for the second frame category must be edged by means of a less common dedicated tool, for example a grinding tool including one or more grinding tools mobile along five mobility axes.

A third category of frames is referred to hereinafter as the "special frames" category.

These "special frames" notably combine frames having the following characteristics:
  mixed means for retaining the lens, for example a bezel on a portion of the outline of the lens and a filament on a portion of the outline of "nylor" frame type, implying that the ophthalmic lens has a non-uniform outline, for example here an outline including a part with a groove to accept the nylor filament and another part including a rib adapted to engage in the bezel of the frame; and/or
  great flexibility of the material constituting the frame.

These frames can moreover have a simple overall shape with a full-rim, "nylor" type semi-rimless or rimless, i.e. drilled, standard structure, the curvature of which is small, moderate or marked.

The outline of the rim of the frame or of the corresponding ophthalmic lens has no area of concavity.

Generally speaking, the acquisition of the outline of the rim of the frames of this third category or of the lens intended to be mounted in a frame of this kind must be produced using a specific instrument such as an outline acquisition tool adapted to capture and to process a plurality of images of the ophthalmic lens alone and/or of the frame in an image capture plane having different orientations relative to this lens and/or this frame.

It can equally be envisaged that this specific instrument comprise a device for acquisition of a representation in three dimensions of the ophthalmic lens and/or of the frame.

The ophthalmic lenses for this third frame category can on the other hand be edged by means of a standard grinding tool, as described above.

FIG. 4 shows an example of a frame belonging to this category. This full-rim frame 30 features two rims 31 and two temples 32, said rims 31 being open at the level of the nose part 33 of this frame. This open portion of the rims 32 makes it impossible to trace these rims using the standard tracing instruments.

A fourth category of frames is referred to hereinafter as the "special plus frames" category.

These "special plus frames" comprise in particular frames having the characteristics of the "special frames" and further featuring a maximum free distance less than or equal to one centimeter and thus an increased risk of collision between the frame and the ophthalmic lenses.

These "special plus frames" also comprise frames of complex shape, for example the outline of which features concave regions.

These are also frames accepting ophthalmic lenses of complex shape, featuring an outline with concave regions or ventilation holes within their volume.

Finally, there also belong to this fourth category frames having "add-ons", i.e. decorative parts extending in front of or to the rear of the mean plane of the rims or of the ophthalmic lenses mounted in these rims and in vertical alignment with the ophthalmic lens. These add-ons imply high risks of collisions.

Generally speaking, the outline of the rim of the frames of this fourth category or of the lens intended to be mounted in a frame of this kind must be acquired, as for the frames of the third category, using a specific instrument, such as an outline acquisition tool adapted to capture and to process a plurality of images of the ophthalmic lens alone and/or of the frame in an image capture plane with different orientations relative to this lens and/or this frame.

It can also be envisaged that this specific instrument comprise a device for acquisition of a representation in three dimensions of the ophthalmic lens and/or of the frame.

The ophthalmic lenses for this fourth frame category must be edged, like those of the second category, using a specific tool, for example a grinding tool including one or more edging tools mobile along five mobility axes.

FIG. 5 shows an example of a frame belonging to this fourth frame category. This half-rim frame 40 features a marked curvature and its ophthalmic lenses 45 feature an outline having areas 45A of concavity.

Step b)

In step b) the operator determines an outline in two or three dimensions of at least one of said ophthalmic lenses intended to be mounted in said frame 10; 20; 30; 40; 50 or of a rim of that frame 10; 20; 30; 40; 50 (blocks 301 to 305 in FIG. 1).

To be more precise, the operator or the computer unit controls the determination of the outline of at least one of said lenses by one of the instruments described above. Which instrument is determined as a function of the frame category determined in step a).

This step b) is carried out as a function of the frame category to which the frame concerned belongs and as a function of the type of retention of the ophthalmic lenses in the frame. In particular, in a step preceding step b) the operator determines the type of the frame concerned from the following types: full-rim, semi-rimless, drilled, multi-retention frame.

The operator preferably then enters this information in the computer processing unit.

Alternatively, this recognition of the frame type is automated. It is performed directly by the computer processing unit, for example on the basis of a captured image of the frame processed by an image recognition algorithm to determine the means for mounting the lenses in the frame.

The method and therefore the instrument used to determine this outline depend on the category to which the frame 10; 20; 30; 40; 50 belongs.

Moreover, the method and the instrument used to determine this outline depend on other characteristics of the frame, such as the type of retention of the ophthalmic lenses and the curvature of this frame.

To be more precise, here, when it has been determined that the frame concerned belongs to one of the first and second standard frame and standard plus frame categories, the type of this frame is determined in a step preceding step b) corresponding to the block 201 in FIG. 1.

If it is determined in this preliminary step that the frame is a semi-rimless or drilled frame, the operator commands the acquisition of the outline in two dimensions of the ophthalmic lens intended to be mounted in the frame (block 303 in FIG. 1).

This is the case for example of the frame 10 from FIG. 2. The operator acquires the outline in two dimensions of one of the ophthalmic lenses 15 of this frame 10. This acquisition in two dimensions is effected using a standard instrument as described above.

This outline can for example be acquired from a drawing of the lens to be mounted in the spectacle frame supplied with the frame. It is a question of a drawing of the predetermined outline of the ophthalmic lens that is associated with the frame in a real form (on paper) or a virtual form (digital file).

The operator can equally for example command the acquisition of this outline from the reference lens supplied with the spectacle frame.

Here the operator preferably determines the outline of only one ophthalmic lens.

This outline is stored in the computer processing unit.

If the operator determines in said preliminary step that the frame is a full-rim frame, the operator then verifies (block 202 in FIG. 1) whether the curvature of the frame exceeds or not a predetermined curvature threshold. To this end the operator determines the base of the frame expressed in diopters. The threshold value of the base of the frame is for example between 5 and 7 and preferably equal to 6.

The operator uses a tool for this, for example charts or an image capture device.

To this end it is possible for example to place the frame on charts giving the base of the frame on the basis of the shape of the front face of this frame.

The operator preferably then enters this information on the base of the frame into the computer processing unit.

Alternatively, this recognition of the frame type is automated.

Capturing an image of the frame seen from above and determining this base by processing the captured image can then be envisaged.

The base of the frame is then determined directly by the computer processing unit, for example from a captured image of the frame processed by an image recognition algorithm.

If the base of the frame is less than 6, the operator acquires the outline in three dimensions of the ophthalmic lens intended to be mounted in the frame (block 301 in FIG. 1) using one of the standard instruments cited above. The operator preferably determines the outline of each rim.

This is the case for example of the frame 20 from FIG. 3 which has a small curvature. In this case the operator determines the outline in three dimensions of each rim 21 of the frame 20.

This is also the case of most metal frames.

If the base of the frame is greater than 6 the operator acquires the outline in three dimensions of the ophthalmic lens intended to be mounted in the frame (block 302 in FIG. 1) using for example one of the standard instruments cited above. The operator preferably determines the outline of only one rim.

This acquisition can be completed by the measurement of the shortest distance between the ophthalmic lenses mounted in the frame and of an angle representing the curvature of the frame using other tools.

In each of these steps the results are stored in the computer processing unit.

If it has been determined that the frame concerned belongs to the third category of special frames, the operator determines as previously in a step preceding step b) whether the frame concerned is a frame of the multi-retention type or not (block 203 in FIG. 1).

If the frame concerned is not of the multi-retention type, i.e. if it features ophthalmic lens retaining means of only one type, the operator acquires the outline in two dimensions of the ophthalmic lens intended to be mounted in the frame (block 304 in FIG. 1). The operator preferably uses for this one of the specific instruments cited above.

This is the case for example of the frame 30 from FIG. 4. The operator acquires the outline in two dimensions of one of the ophthalmic lenses 35 of this frame 30.

As described above, the operator can then acquire this outline from a drawing of the lens to be mounted in the frame supplied with the spectacle frame. This is a drawing of the predetermined outline of the ophthalmic lens that is associated with the frame in a real form (on paper) or a virtual form (digital file).

The operator can equally for example command the acquisition of this outline from the reference lens supplied with the spectacle frame, i.e. the display lens or the old lens supplied with the frame.

This outline is stored in the computer processing unit.

Here the operator preferably determines the outline of only one ophthalmic lens.

This determination of the outline can be completed by the measurement of the shortest distance between the ophthalmic lenses mounted in the frame and of an angle representing the curvature of the frame.

If it has been determined that the frame concerned belongs to the fourth category of special plus frames or that it belongs to the third category and is of the multi-retention type, the outline of the frame is acquired using the specific instrument mentioned above in connection with this fourth frame category and using the associated specific method (block 305 in FIG. 1).

This outline is stored in the computer processing unit.

Step c)

In step c) the operator evaluates the value of each parameter from a list of parameters of said frame (block 400 in FIG. 1).

This list is determined as a function of said frame category determined in step a).

Other information can be taken into account to establish this list: for example, the type of frame, full-rim, semi-rimless, drilled, and the type of frame material, metal or plastic.

The list of parameters is preferably determined by the computer processing unit from the information stored in steps a) and b). In this case the processing unit is programmed accordingly.

Said list of parameters of said frame used in step c) comprises parameters relating to:

the shape of the frame such as the following parameters: symmetry of the frame about a horizontal axis and/or a vertical axis, accuracy of the outline determined in step b), presence and/or position and/or extent of the areas of concavity of the outline determined in step b), overall curvature of the frame, geometrical characteristics of the bezel such as the shape of the profile of the bezel, the depth of the bezel, the angle of inclination between the internal walls of the bezel, the position of the bezel relative to the front and rear faces of the corresponding rim of the frame, the uniformity of the characteristics of the profile of the bezel along the latter, the mechanical characteristics of the frame such as the degree of flexibility of the bridge of the frame, the temples and the rims, the compatibility with the frame of the material used to manufacture the ophthalmic lenses, the constraints on mounting the ophthalmic lens in the frame such as the position of the articulation between the temples and the rims, the possibility of heating the frame, the distance between the folded temples and the rims of the frame, the resistance of the frame to chemical products used to clean the frame and/or the ophthalmic lenses, the possibility of removing the ophthalmic lenses from the frame without damaging it, the consistency between the outline in two or three dimensions determined in step b) and said at least one geometrical and/or mechanical and/or structural characteristic of this frame determined in step a).

For example, for a first standard category frame, semi-rimless of the nylor type, or a second standard category frame, drilled (rimless), the list of parameters can contain the following parameters:

the quality of the measured 2D outline,
the concavity of the 2D outline,
the compatibility with the information processing software,
the flexibility of the bridge,
the compatibility of the lens to be mounted,
the position of the mounting bars if the upper part of the frame is of metal,
the chemical resistance of the frame, and
the presence of decorative elements.

For a third standard category full-rim frame or a fourth standard plus category full-rim frame the list of parameters can contain the parameters cited above and the following additional parameters:

the symmetry of the frame,
the noise on the measured 3D outline,
the profile of the bezel,
the base of the frame,
the centering of the bezel,
the uniformity of the angle of the bezel,
the uniformity of the depth of the bezel,
the minimum depth of the bezel,
the shape of the U-shaped bezel,
the flexibility of the rims,
the flexibility of the dimension B of the rim,
the possibility of heating the frame when the latter is made of plastic, and
the distance between the folded temples and the rear face of the lens.

The value of at least some of said parameters is evaluated as a function of said outline determined in step b).

This evaluation is done by the computer processing unit.

In the above examples from the list of parameters these are in particular parameters relating to the shape of the frame.

Determining the shape parameters of the frame moreover enables verification of the quality of the outline determined in step b).

The symmetry parameter of the frame is evaluated by the computer processing unit by comparing the dimensions A and B of the outline for the right and left rims. These dimensions A and B correspond to the boxing width and height of the outline. In practice these are the width and height of a boxing rectangle in which the rim of the frame is inscribed. These are symmetries with respect to two orthogonal median planes of each rim of the frame.

The quality of the measured outline in two dimensions can be degraded by vibrations of the instrument used for the measurement, wear of the feeler or defects in the molding of the bezel for example. Here it is a question of assessing the accuracy of the measured outline determined in step b).

The quality parameter of the measured outline is evaluated by the computer processing unit by comparing the measured outline in two dimensions and an expected predetermined outline associated with the frame, in a real or virtual manner.

This expected outline can be part of the geometrical characteristics of the frame determined in step a). This parameter then relates to the consistency between the outline determined in step b) and the characteristics of the frame determined in step a).

Here this expected outline is a theoretical convex shape extrapolated by the computer processing unit from the measured points of the outline.

The difference between these two outlines can be expressed as a percentage corresponding for example to the percentage of measured points situated inside the expected outline when the measured outline and the expected outline are superimposed.

These points define concave areas of the measured outline. A first percentage threshold value of points belonging to a concave area of the frame is associated with the quality parameter. If the percentage of points belonging to a concave area of the frame determined is below this first threshold value the quality parameter determined by the computer processing unit takes a first value indicating that the quality of the measured outline is satisfactory.

If the percentage of points belonging to a concave area of the frame determined is above this first threshold value the quality parameter determined by the computer processing unit takes a second value indicating that the quality of the measured outline is not satisfactory, unless the concavity parameter indicates that the outline is concave.

The concavity parameter is a binary parameter the value of which is determined by the computer processing unit on the basis of the percentage of points belonging to a concave area of the frame determined beforehand. It is associated with a second percentage threshold value above the first threshold value.

If the percentage of points belonging to a concave area of the frame determined is below this second threshold value the computer processing unit determines that the concavity parameter takes a first value indicating that the measured outline is convex.

The concavity parameter is set at 1 for example.

If the percentage of points belonging to a concave area of the frame determined is above this second threshold value the computer processing unit determines that the concavity parameter takes a second value indicating that the measured outline features concave parts not linked to an insufficient quality of the measured outline.

The concavity parameter remains at 0 for example.

It can equally be a numerical parameter the value of which reflects that of the percentage determined. The concavity parameter can equally reflect the extent of the concave regions of the outline determined in step b). This parameter can equally take account of the position of the concave regions on this outline.

The measurement noise parameter of the outline in three dimensions is determined by examining visually the traced outlines displayed on a screen belonging for example to the computer processing unit. Here this is also a binary parameter. The presence of irregularities in this trace leads to the setting of this parameter to the value 1.

This parameter can equally be determined by the computer processing unit by comparing the measured outline and a theoretical outline determined for example by the electronic control unit as a function of the measured points of the outline.

If this parameter is equal to 1 the operator looks at the bezel of the frame to see if there exist irregularities that can explain those observed on the measured outline. If not, the determination of the outline in three dimensions is repeated.

The parameter of compatibility with the information processing software is a binary parameter that indicates if the information on the frame available for the information processing software is sufficient.

For example the information on the frame is transmitted to software of the computer processing unit that compares it to the information available on the lens intended to be mounted in the frame (material, power, etc.) and determines by calculation if mounting the lens in this frame is possible. The parameter of compatibility with the software indicates if the available information on the frame is sufficient to perform this calculation.

The base parameter of the frame is a binary parameter that is set to 1 if the base of the frame is above said predetermined base threshold, for example equal to 6 diopters.

The parameters relating to the bezel enable account to be taken of various geometrical characteristics of this bezel such as the overall shape of the profile of the bezel and the dimensions of this profile. For example, in the case of a V-shaped profile, the angle between the internal walls of this bezel and the depth of this bezel are measured. These parameters are numerical, with a value equal to the value of the angle or of the depth measured.

These parameters relating to the bezel can equally reflect the uniformity of the aforementioned geometrical characteristics of the bezel along it, i.e. all around the rim of the frame. Indeed, a lack of uniformity can render mounting the lens in the rim impossible.

The centering parameter of the bezel is a binary parameter that is set to 1 if the bezel is not centered, i.e. is not symmetrical with respect to the thickness of the corresponding rim of the frame. It can equally be a numerical parameter the value of which reflects the off-centering of the bezel.

Finally, the classic shape of the bezel is a V-shape. If the bezel has some other shape, notably a U-shape, the shape parameter of the bezel reflects this particular feature.

The parameters relating to the bezel are determined because they can impact on the mounting of the lenses in the bezel. Consequently some elements of the edging set point can be determined as a function of these parameters.

The flexibility of the bridge, the flexibility of the rims and the flexibility of the dimension B of the rim parameters are evaluated manually by the operator.

The compatibility of the lens to be mounted concerns for example the compatibility of the materials of the frame and of the ophthalmic lens. For example, an acetate frame is incompatible with polycarbonate lenses. Here this is a binary parameter. It can also be a question of compatibility with the thickness and/or the index of the lens.

Generally speaking these parameters are determined by the computer processing unit.

The operator also evaluates parameters relating to mounting the lenses in the frame, for example the position of the mounting bars of the frame if it is metal or the possibility of heating the frame in the case of plastic frames. These parameters can be binary to indicate merely if the position or heating is acceptable or numerical with a value indicating the offset from the optimum position of the bars or the temperature range allowed for heating.

The computer processing unit can equally be programmed to determine the parameters, for example from a captured image of the frame or information on the material of the frame entered by the operator.

The distance between the folded temples and the rear face of the lens parameter indicates if the temples can be folded regardless of the thickness of the lens. In a similar way these parameters can be either binary to indicate merely if folding is possible or numerical with a value indicating the minimum distance between the rims and the temples when the latter are folded. The computer processing unit can equally be programmed to determine this parameter, for example from a captured image of the frame.

The chemical resistance parameter indicates if the frame can be cleaned using the chemical products routinely used without risk of degrading the appearance of this frame.

Finally, the parameter concerning the presence of decorative elements indicates the presence of elements of the frame extending above the location of the ophthalmic lens. The presence of any such element can prevent the tracing of the outline of the rims of the frame by some instruments or even all instruments. This parameter can be binary or reflect the distance between the point of this element at the greatest distance from the internal edge of the rim of the frame and this internal edge.

Other parameters can equally be envisaged, for example parameters reflecting the overall esthetics of the frame, frame manufacturing defects, the fact that the reference lenses can be removed from the frame without damaging it, for example.

The computer processing unit is preferably programmed to determine the value of all these parameters.

Step d)

In step d) each value of one of the parameters of the frame evaluated in step c) is associated with a score of the frame for that parameter and the conformity of the frame to the predetermined criterion is determined as a function of the scores of this frame.

In practice, the computer processing unit is programmed to determine the score of the frame for each parameter as a function of the value of this parameter determined in step c).

To be more precise the conformity of the frame to the predetermined criterion is determined by comparing the score of the frame for each evaluated parameter and a reference score associated with this parameter.

In practice the computer processing unit is in this case programmed to compare the score of the frame for each parameter to said reference score associated with this parameter stored in this computer processing unit.

Said reference score depends on the criterion of use to be verified.

This criterion of use can for example be the feasibility criterion or the industrial feasibility criterion mentioned above. Depending on this comparison, the computer processing unit determines the conformity of the frame to the criterion of use corresponding to the reference scores used.

It can for example be envisaged that the score associated with each parameter be equal to the value of this parameter and that the reference score be equal to a threshold value of this parameter. If the value of each parameter is above the threshold value for this parameter the conformity of the frame to the criterion of use with which the threshold values of the parameters are associated is verified.

Thus the verification method according to the invention finally gives the operator an indication relating to the feasibility and/or the industrial feasibility of using a given process on a pair of spectacles comprising the frame concerned.

This indicator can be numerical or visual.

Here it is given by the computer processing unit.

When the indicator is visual it can for example comprise a graphical representation of the scores associated with each parameter, for example on a spider web or radar screen diagram. This can be a bar chart for binary scores. The method according to the invention preferably supplies the indicator relating to the feasibility criterion and then, for frames conforming to this criterion, the indicator relating to the industrial feasibility criterion.

This graphical representation can be displayed on a screen of the computer processing unit.

The indicator can equally comprise an audible signal emitted by the computer processing unit.

Using the method according to the invention it is equally possible to verify the conformity of the frame concerned with a quality criterion of the pair of spectacles obtained.

It is equally possible to highlight non-reproducibility of spectacle frames with the same reference.

This is possible thanks to storing the geometrical and/or mechanical and/or structural characteristics of this frame determined in step a) and the values of the parameters determined in step c) in a database representing commercially available frames.

A statistical analysis of this data by the computer processing unit enables highlighting of spectacle frames with the same reference that do not conform to the feasibility and/or industrial feasibility and/or quality criteria.

Moreover, it allows highlighting of spectacle frames for which the standard processing methods are prohibited. An alert signal can be transmitted to the operator if the frame concerned is in this situation.

The invention claimed is:

1. A method, executed by a computer, for verifying a conformity of a spectacle frame with a predetermined criterion of use of said spectacle frame, said spectacle frame configured to receive two ophthalmic lenses, the method comprising the steps of:
   a) determining at least one of a geometrical, mechanical, and structural characteristic of the spectacle frame, said determining carried out either visually by an operator or by reading a frame identification file recorded on a data storage in communication with said computer and associated with said spectacle frame, and determining a frame category to which said spectacle frame belongs from a set of predetermined spectacle-frame categories recorded on the data storage in communication with said computer;
   b) determining an outline, in two or three dimensions, of at least one of i) a rim of said spectacle frame and ii) one of said ophthalmic lenses to be mounted in said spectacle frame, and storing said determined outline in the computer;
   c) evaluating a value of each parameter from a list of parameters of said spectacle frame recorded on the data storage in communication with said computer, said list being determined as a function of said frame category determined in step a), the value of at least one of the parameters evaluated by said computer as a function of said measured outline determined in step b), each value of the at least one of the parameters of the spectacle frame being associated with a score for the spectacle frame; and
   d) deducing the conformity of the spectacle frame to the predetermined criterion of use from the values of said parameters of the spectacle frame determined in step c) by comparing, by the computer, the score of the spectacle frame for each evaluated value with a reference score recorded on the data storage in communication with said computer and associated with the parameter associated with the value, each said reference score depending on said predetermined criterion of use.

2. The verification method as claimed in claim 1, wherein said at least one of a geometrical, mechanical, and structural characteristic of the spectacle frame determined in step a) relates to a type of outline determining method necessary for determining said outline of the at least one of i) said spectacle frame and ii) the at least one of said ophthalmic lenses to be mounted in said spectacle frame, or relates to a type of method necessary for edging the at least one of said ophthalmic lenses.

3. The verification method as claimed in claim 1, wherein said at least one of a geometrical, mechanical, and structural characteristic of the spectacle frame determined in step a) comprises at least one of the following:
   a general shape of the spectacle frame,
   a type of retention of the ophthalmic lenses to the spectacle frame,
   a shape of a profile of a bezel of the spectacle frame,
   a position of the bezel of the spectacle frame relative to front and rear faces of the spectacle frame,
   a shape of a nose portion of the spectacle frame that contacts a nose of a wearer of the spectacle frame, a presence of elements partly covering a rear face or the front face of the ophthalmic lenses disposed in the spectacle frame, mechanical characteristics of a material of the spectacle frame, a presence of areas of concavity in said outline of a rim of the spectacle frame, and a presence of areas of concavity in the outline of the ophthalmic lens.

4. The verification method as claimed in claim 1, wherein in step a) each geometrical or mechanical or structural characteristic of the spectacle frame is determined by reading the frame identification file associated with the spectacle frame.

5. The verification method as claimed in claim 1, wherein in step a) said at least one of a geometrical, mechanical, and structural characteristic of the spectacle frame is determined visually by an operator.

6. The verification method as claimed in claim 1, wherein in step b) the outline of the one of said ophthalmic lenses to be mounted in said spectacle frame is determined by one of i) image acquisition from a reference ophthalmic lens associated with said spectacle frame, and ii) on basis of an ophthalmic lens drawing associated with said spectacle frame.

7. The verification method as claimed in claim 1, wherein in step b) the outline of the spectacle frame is determined by determining a position in three dimensions of a bezel of the rim of said spectacle frame.

8. The verification method as claimed in claim 1, wherein in step c) said list of parameters of said spectacle frame comprises parameters relating to:

a shape of the spectacle frame, geometrical characteristics of a bezel of the spectacle frame, mechanical characteristics of the spectacle frame, a compatibility with the spectacle frame of material used to manufacture the ophthalmic lenses, one or more constraints on mounting the ophthalmic lens in the spectacle frame, and consistency between the outline in two or three dimensions determined in step b) and said at least one geometrical or mechanical or structural characteristic of the spectacle frame determined in step a).

9. The verification method as claimed in claim 1, wherein in step d) the predetermined criterion of use of the spectacle frame is a criterion of feasibility of a pair of spectacles indicating that the spectacle frame is adapted to receive the corresponding ophthalmic lenses or a criterion of industrial feasibility indicating that the spectacle frame is adapted to receive the corresponding ophthalmic lenses via a predetermined industrial fabrication process.

10. A device for verifying a conformity with a predetermined criterion of use of a spectacle frame configured to receive two ophthalmic lenses, comprising a computer programmed to execute the steps of the method as claimed in claim 1.

11. A device for verifying a conformity with a predetermined criterion of use of a spectacle frame configured to receive two ophthalmic lenses, comprising a computer programmed to carry out the steps of the method as claimed in claim 1, and a shape determining instrument for measuring an outline, in two or three dimensions, of at least one of i) said spectacle frame and ii) one of at least one of said ophthalmic lenses to be mounted in said spectacle frame, said shape determining instrument being one of:

an outline tracer fitted with a stylus or an edger-tracer that palpate the interior outline of a rim of the spectacle frame in order to determine accurately the coordinates of points characterizing a shape of the outline of this rim, optical means using an image capture device in order to capture an image of one of said ophthalmic lens to determine the shape of the outline and trace the outline with a computer using an outline detection algorithm that processes the captured image, an outline acquisition tool adapted to capture and to process a plurality of images of the ophthalmic lens and/or of the spectacle frame in an image capture plane having different orientations relative to the ophthalmic lens and/or the spectacle frame, and a device for acquisition of a representation, in three dimensions, of the ophthalmic lens and/or of the spectacle frame.

12. The verification method as claimed in claim 2, wherein said at least one of a geometrical, mechanical, and structural characteristic of the spectacle frame determined in step a) comprises at least one of the following:

a general shape of the spectacle frame, a type of retention of the ophthalmic lenses to the spectacle frame, a shape of a profile of a bezel of the spectacle frame a position of the bezel of the spectacle frame relative to front and rear faces of the frame, a shape of a nose portion of the spectacle frame that contacts a nose of a wearer of the spectacle frame, a presence of elements partly covering a rear face or the front face of the ophthalmic lenses disposed in the spectacle frame, mechanical characteristics of a material of the spectacle frame, a presence of areas of concavity in said outline of a rim of the spectacle frame, and a presence of areas of concavity in the outline of the ophthalmic lens.

13. The verification method as claimed in claim 2, wherein in step b) the outline of the one of said ophthalmic lenses to be mounted in said spectacle frame is determined by one of i) image acquisition from a reference ophthalmic lens associated with said spectacle frame, and ii) on basis of an ophthalmic lens drawing associated with said spectacle frame.

14. A method, executed by a computer, for verifying a conformity of a spectacle frame with a predetermined criterion of use of said spectacle frame, said spectacle frame configured to receive two ophthalmic lenses, the method comprising the steps of:

a) using a reader, in communication with the computer, to read a frame identification file recorded on a data storage in communication with said computer and associated with said spectacle frame, and determining therefrom at least one of the group consisting of: a geometrical characteristic of the spectacle frame, a mechanical characteristic of the spectacle frame, and a structural characteristic of the spectacle frame, and then determining a frame category to which the spectacle frame belongs from a set of predetermined spectacle-frame categories;

b) determining an outline in two or three dimensions of at least one of i) a rim of said spectacle frame and ii) one of said ophthalmic lenses to be mounted in said frame, and storing said measured outline in the computer;

c) evaluating a value of each parameter from a list of parameters of said frame recorded on the data storage in communication with said computer, the list of parameters being determined as a function of said frame category determined in step a), the value of at least one of the parameters evaluated by said computer as a function of said outline determined in step b), each value of the at least one of the parameters of the spectacle frame being associated with a score for the frame; and d) deducing the conformity of the spectacle frame to the predetermined criterion of use from the values of said parameters of the spectacle frame determined in step c) by comparing, by the computer, the score of the frame for each evaluated value with a reference score recorded on the data storage in communication with said computer and associated with the evaluated parameter, each said reference score depending on said predetermined criterion of use.

* * * * *